United States Patent [19]

Huelsman et al.

[11] Patent Number: 5,694,701

[45] Date of Patent: Dec. 9, 1997

[54] COATED SUBSTRATE DRYING SYSTEM

[75] Inventors: Gary L. Huelsman; William B. Kolb, both of St. Paul, Minn.

[73] Assignee: Minnesota Mining and Manufacturing Company, St. Paul, Minn.

[21] Appl. No.: 699,522

[22] Filed: Sep. 4, 1996

[51] Int. Cl.$^6$ ........................................ F26B 7/00
[52] U.S. Cl. ........................... 34/421; 34/463; 34/469; 34/73
[58] Field of Search ............... 34/73, 76–77, 34/468–469, 421–422, 446, 463; 165/110, 913

[56] References Cited

U.S. PATENT DOCUMENTS

| | | | |
|---|---|---|---|
| 1,494,830 | 5/1924 | Cook | 34/77 |
| 4,321,757 | 3/1982 | van der Blom | 34/77 X |
| 4,365,423 | 12/1982 | Arter et al. | 34/463 |
| 4,389,797 | 6/1983 | Spigarelli et al. | 34/78 X |
| 4,413,425 | 11/1983 | Candor | 34/251 |
| 4,894,927 | 1/1990 | Ogawa et al. | 34/507 |
| 4,951,401 | 8/1990 | Suzuki et al. | 34/77 |
| 4,999,927 | 3/1991 | Durst et al. | 34/448 |
| 5,448,838 | 9/1995 | Edmonds | 34/73 |
| 5,581,905 | 12/1996 | Huelsman et al. | 34/421 |

FOREIGN PATENT DOCUMENTS

| | | |
|---|---|---|
| 40 09 797 | 10/1991 | Germany. |
| 1 401 041 | 7/1975 | United Kingdom. |

OTHER PUBLICATIONS

Lopez de Ramos, A. L., "Capillary Enhanced Diffusion of $CO_2$ in Porous Media," Ph.D. Thesis, University of Tulsa (1993).

*Primary Examiner*—John M. Sollecito
*Assistant Examiner*—Steve Gravini
*Attorney, Agent, or Firm*—Gary L. Griswold; Walter N. Kirn; Charles D. Levine

[57] ABSTRACT

A method and apparatus of drying a substrate uses a condensing surface located adjacent the substrate on the side of the substrate being dried. The liquid from the substrate is evaporated and then condensed on the condensing surface without applied convection. The condensed liquid is removed from the condensing surface while the condensed liquid remains liquid. Evaporation can be performed by heating the substrate without applied convection.

27 Claims, 6 Drawing Sheets

COATED SUBSTRATE DRYING SYSTEM

TECHNICAL FIELD

The present invention relates to a method and apparatus for transporting mass and energy and for drying coatings on a substrate. More particularly, the present invention relates to transporting mass and energy and drying substrates in enclosed areas.

BACKGROUND OF THE INVENTION

Drying coated substrates, such as webs, requires supplying energy to the coating and then removing the evaporated liquid. The liquid to be evaporated from the coating can be any liquid including solvents such as organic solvent systems and inorganic systems which include water-based solvent systems. Convection, conduction, radiation, and microwave energy are used to supply energy to coated webs. Applied convection or forced gas flow is used to remove the evaporated liquid. Applied convection is defined as convection produced by the input of power and caused intentionally. It excludes convection caused merely by web movement, natural convection, and other, unavoidable, forces. In some instances where the vapors are non-toxic, such as water evaporation, the vapor is removed by flashing off into the ambient atmosphere.

In conventional drying technology, large volumes of gas, inert or not, are required to remove evaporated liquid from the gas/liquid interface. These dryers require large spaces between the coated web being dried and the top of the drying enclosure to accommodate the large gas flows. Drying is governed at the gas/liquid interface by diffusion, convection, boundary layer air from the moving web and impinging air streams, vapor concentrations, and liquid to vapor change-of-state convection, among other factors. These phenomena occur immediately above the coated web, typically within 15 cm of the surface. Because conventional dryers have a large space above the coated web, and they can only control the average velocity and temperature of the bulk gas stream, they have limited ability to control these phenomena near the gas/liquid interface.

For organic solvent systems, the vapor concentrations in these bulk gas streams are kept low, typically 1–2%, to remain below the flammable limits for the vapor/gas mixture. These large gas flows are intended to remove the evaporated liquid from the process. The expense to enclose, heat, pressurize, and control these gas flows is a major part of the dryer cost. It would be advantageous to eliminate the need for these large gas flows.

These gas streams can be directed to condensation systems to separate the vapors before exhausting, using large heat exchangers or chilled rolls with wiping blades. These condensation systems are located relatively far from the coated web in the bulk gas flow stream. Due to the low vapor concentration in this gas stream, these systems are large, expensive, and must operate at low temperatures.

It would be advantageous to locate the condensation systems close to the coated substrate where the vapor concentrations are high. However, conventional heat exchangers would drain the condensed liquid by gravity back onto the coating surface and affect product quality unless they were tilted or had a collection pan. If they had a collection pan they would be isolated from the high concentration web surface. If they were tilted dripping would probably still be a problem. Also, conventional heat exchangers are not planar to follow the web path and control the drying conditions.

U.S. Pat. No. 4,365,423 describes a drying system which uses a foraminous surface above the web being dried to shield the coating from turbulence produced by the large gas flows to prevent mottle. However, this system does not eliminate applied convection, requires using secondary, low efficiency solvent recovery, and has reduced drying rates. Also, because of the reduced drying rates, this patent teaches using this shield for only 5–25% of the dryer length.

German Offenlegungeschrift No. 4009797 describes a solvent recovery system located within a drying enclosure to remove evaporated liquid. A chilled roll with a scraping blade is placed above the web surface and removes the vapors in liquid form. No applied convection removes the evaporated liquid. However, the roll is only in the high vapor concentration near the surface for a short section of the dryer length. This does not provide optimal control of the conditions at the gas/liquid interface. In fact as the roll rotates it can create turbulence near the web surface. Also, this system can not adapt its shape to the series of planar surfaces of the coated web as it travels through the dryer. Therefore, the system can not operate with a small, planar gap to control drying conditions and can not achieve optimum condensing efficiency.

U.K. patent No. 1 401 041 describes a solvent recovery system that operates without the large gas flows required for conventional drying by using heating and condensing plates near the coated substrate. The solvent condenses on the condensing plate and then the condensed liquid drains by gravity to a collection device. This apparatus uses only gravity to remove the liquid from the condensing surface. Accordingly, the condensing surface can not be located above the coated substrate since gravity will carry the condensed liquid back onto the coated substrate. In the drawings and discussion (page 3, lines 89–92) the condensing surface is described as vertical or with the coated substrate, coated side facing down, above the condensing surface. Applying a coating to the bottom side of the substrate or inverting the substrate after application of the coating is not the preferred method in industry. Coating in an inverted position and inverting a coated substrate before drying can create coating defects. These limitations greatly reduce the flexibility of the method and entail significant costs to adapt it to standard manufacturing methods. This requirement for vertical or inverted drying is very likely the reason this method has not been adopted or discussed in the industry.

U.K. patent No. 1 401 041 also describes, on page 2 line 126 to page 3 line 20, the problems of this method with growth of the liquid film layer on the condensing surface and droplet formation. Because "the resulting liquid film 14 may increase in thickness towards the lower end of the condenser," the length of the condensing surface is limited by the buildup and stability of this film layer. Limiting the length of the condensing surface will limit the dryer length or require exiting the drying system with the coating not dried. This has the undesirable effect of losing some of the solvent vapors to the atmosphere, losing control of the drying phenomena, and creating defects. Another limitation is that the distance of the condensing surface from the coated substrate "can hardly fall below about 5 millimeters" to prevent contacting the condensing liquid film with the substrate, and to prevent droplets from contacting the substrate.

The limitations of this system to vertical or inverted drying, limits in the length of the dryer, and the inability to operate at desired distances from the coated substrate render it inadequate to achieve the desired drying benefits.

There is a need for a system for drying coated substrates which provides improved control of the conditions near the gas/liquid interface, which eliminates the need for applied convection to transport the evaporated liquid, and which improves the efficiency of the condensation vapor recovery systems. There is also a need for a system that can operate with small gaps adjacent the substrate.

SUMMARY OF THE INVENTION

The invention is a method and apparatus of transporting mass and energy and drying a coated substrate. A condensing surface is located adjacent the substrate, spaced less than 5 mm from the substrate, on the side of the substrate being dried (the side with the coating). The liquid from the coated substrate is evaporated and is then condensed on the condensing surface without requiring applied convection. The condensed liquid is transported from the condensing surface while it remains liquid.

The condensed liquid can be removed, at least in part by using gravity. The condensing surface can be tilted to at least one transverse side of the coated substrate. Gravity transports the condensate from the condensing surface. Also, the condensed liquid can be removed using surface tension or capillary forces such as by using foraminous material.

A plurality of condensing surfaces could be used. One could be a condensing platen located above and tilted to at least one transverse side of the coated substrate, and others could be sheets, having upper and lower surfaces. The sheets can be located below the condensing platen such that they are slanted away from the horizontal with their lower edge facing the lower edge of the condensing platen. The sheets can overlap each other and be spaced apart in the overlap region.

In another embodiment, the condensing platen has a condensing plate and a foraminous sheet having an upper surface and a lower surface located below and spaced from the condensing platen. The upper and lower surfaces of the foraminous sheet form condensing surfaces. The width of the space between the condensing platen and the foraminous sheet, the size of the foramina in the sheet, and the ratio of open area to solid area on the foraminous sheet can be selected to cause the surface tension forces to retain the condensate on the condensing surfaces.

The rate of drying can be controlled by controlling the height of the gap and the temperature differential between the coated substrate and the condensing surface.

The condensing surface can be formed on a stationary or rotating belt. Alternatively, the condensing surface can be formed of flat or grooved plates of any type, tubes, fins, or other shapes. The condensing surface can be formed of a foraminous plate which uses Young-Laplace surface tension forces to retain and capillary forces to transport the condensate.

If the condensing surface causes the condensed liquid to flow longitudinally, a collection system can be used to collect the liquid or structure on the condensing surface can direct the liquid. Structure, such as ribs, on the condensing surface, can limit the buildup of condensate and prevent the formation of droplets.

The condensing surface can be formed of at least one of flat plates, grooved plates, tubes, or fins. The condensing surface can be formed of a foraminous plate which uses Young-Laplace surface tension forces to retain and capillary forces to transport the condensate.

In another embodiment, a plurality of condensing surfaces and a plurality of heaters for evaporating can be used. Each heater corresponds to a respective condensing surface to form pairs of condensing surfaces and heaters. These pairs can be independently controlled.

A film layer of condensate can be created on the condensing surface to prevent formation of droplets of condensate and prevent bridging of the condensate to the substrate.

The invention is also an apparatus for reducing and controlling undesired evaporation of liquid at locations outside drying positions with only ambient heat to evaporate the liquid. The invention is also an apparatus for reducing and controlling liquid evaporation and natural convection induced defects on a substrate at locations outside drying positions.

Evaporation can be performed by supplying energy to the substrate without applied convection. The substrate can move relative to the apparatus. Removing the condensed liquid can inherently recover the liquid removed from the coated substrate.

An edge plate adjacent the condensing surface can remove the condensed liquid from the condensing surface after the liquid travels to the edge plate.

DETAILED DESCRIPTION

The system of this invention is a method and apparatus for transporting mass and energy and for drying coatings on a coated substrate, such as a moving web, with a condensing surface creating a small, controlled-environment gap above the coating surface. Other physical and chemical phenomena that occur during the drying process, such as chemical reactions, curing, and phase changes, which can also be affected by the invention.

Figure 1:
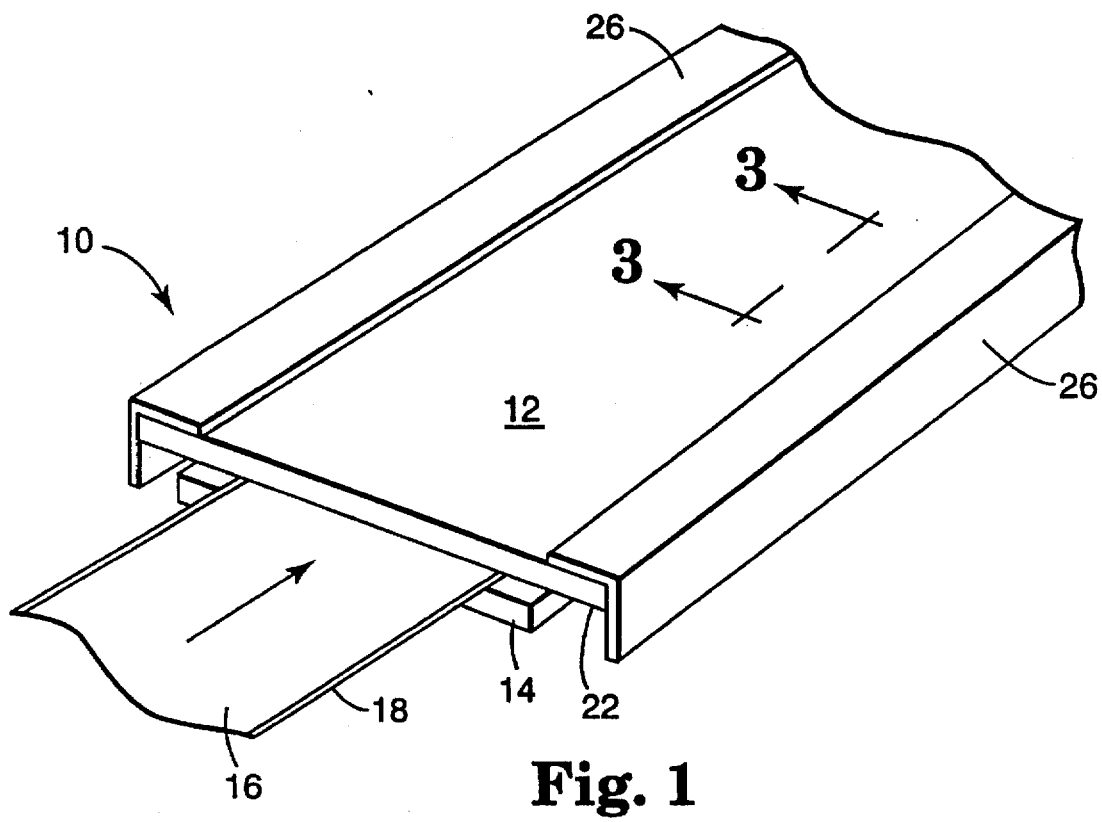
FIG. 1 is a perspective view of the drying apparatus of the invention.
Figure 2:
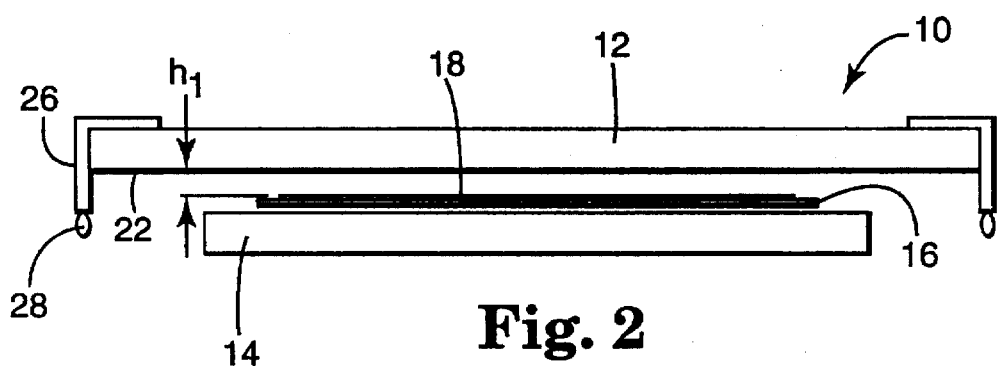
FIG. 2 is an end view of the apparatus of FIG. 1.
Figure 3:
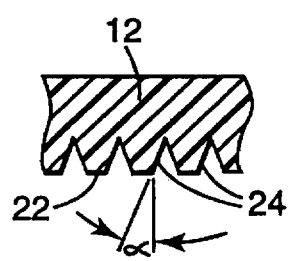
FIG. 3 is a cross-sectional view taken along line 3—3 of FIG. 1.

In the embodiment of FIGS. 1, 2, and 3, drying (heating the liquid to evaporate it to a vapor, transporting the vapor away from the web, condensing the vapor, and transporting the condensed vapor (also known as condensate) away from the web) occurs without requiring the applied gas convection associated with conventional drying methods. This reduces mottle formation associated with many precision coatings and enables drying at increased drying rates. In the embodiment of FIGS. 4–15, at least the removal of the evaporated liquid from the web occurs without requiring applied gas convection. All versions of this system attain improved control of the phenomena occurring near the gas/liquid interface and attain high liquid recovery efficiencies.

All versions use condensation to remove evaporated liquid in a gap which can be substantially planar without requiring applied convection forces, and where ambient and boundary layer convection forces are minimized. The drying system has numerous advantages over the conventional drying technology by creating a small, controlled-environment gap adjacent the coating surface, and by eliminating the requirement for applied convection from the drying mechanism. In some products a chemical reaction or other physical and chemical processes occur in the coating during drying. The drying system functions whether or not these processes are proceeding within the process. The drying system can affect these processes during drying. One example is of moisture-cured polymers dispersed or dissolved in a solvent that can be adversely affected during the drying process due to the presence of humidity in the drying atmosphere. Because the invention can create a small, controlled environment gap above the coating surface, it is substantially simpler to provide a controlled humidity drying atmosphere to improve the curing of these polymers. By improving control of the drying phenomena and creating a small, controlled environment gap above the coated surface, there are many other applications where other physical and chemical processes occurring during the drying process can benefit.

In an alternative method the drying system can be combined with applied convection, and the applied convection can be produced by forcing gas across the coating, either longitudinally, transversely, or in any other direction. This can provide additional mass transfer or other modification to the atmosphere above the coated surface. This method could be used where applied convection is not a detriment to product properties.

The inventors have found that in drying substrates, significant drying improvements and increased drying rates occur when the distance from the condensing surface to the coated substrate is below 5 millimeters. The system of U.K. patent No. 1 401 041 is not practically operable in the range where significant drying control improvements can be made.

Many kinds of condensing structures can be used, such as plates of any type, whether flat or not, porous or not, structured or not, or other shapes such as tubes or fins. The condensing surface structure can combine macro, meso, and micro scale geometries and dimensions. Plates include fixed or moving platens, moving belts with or without liquid scrapers, and similar devices. The condensing structure can be parallel to the web or angled with the web, and can have planar or curved surfaces.

The condensing surface must satisfy three criteria. First, it must be capable of sufficient energy transfer to remove the latent heat of condensation. Second, the condensate must at least partially wet the condensing surface. Third, the condensing surface must prevent the condensed vapor (the condensate) from returning to the coated surface of the web. Associated with a condensing surface is an effective critical condensate film thickness which marks the onset of film nonuniformities. This thickness is a function of the condensing surface material, geometry, dimensions, topology, orientation, configuration, and other factors, as well as the physical properties of the condensate (such as surface tension, density, and viscosity). Another feature of the system is condensate transport and removal. This maintains the condensate film thickness less than the effective critical thickness and can be accomplished by capillary forces, gravitational forces, mechanical forces, or various combinations of these forces.

Capillary force, or capillary pressure, can be described as the resultant of surface tension acting in curved menisci and is governed by the fundamental equation of capillarity known as the Young-LaPlace equation. The Young-LaPlace equation is $\Delta P = \sigma(1/R_1 + 1/R_2)$, where $\Delta P$ is the pressure drop across the interface, $\sigma$ is the surface tension, and $R_1$ and $R_2$ are the principal radii of curvature of the interface. Capillarity is discussed in detail in Adamson, A. W. "Physical Chemistry of Surfaces, 4th ed.", John Wiley & Sons, Inc. (1982). FIGS. 1, 2, 4, 5, 9, 10, and 11 show examples of using capillary forces, along with other forces, to remove the condensate from the condensing surface.

Gravitational forces result from the position of the fluid mass in a gravitational field, which is the hydrostatic head. FIGS. 7, 8, 10, and 12 show examples that use gravitational forces, along with other forces, to remove the condensate from the condensing surface.

Other mechanisms can be used to remove the condensed liquid from the condensing surface to prevent the condensed liquid from returning to the substrate. For example, mechanical devices, such as wipers, belts, scrapers, pumping systems, or any combination, can be used to remove the condensed liquid. FIGS. 6, 13, 14, and 15 show examples that use mechanical forces, along with other forces, to remove the condensate from the condensing surface.

Figure 4:
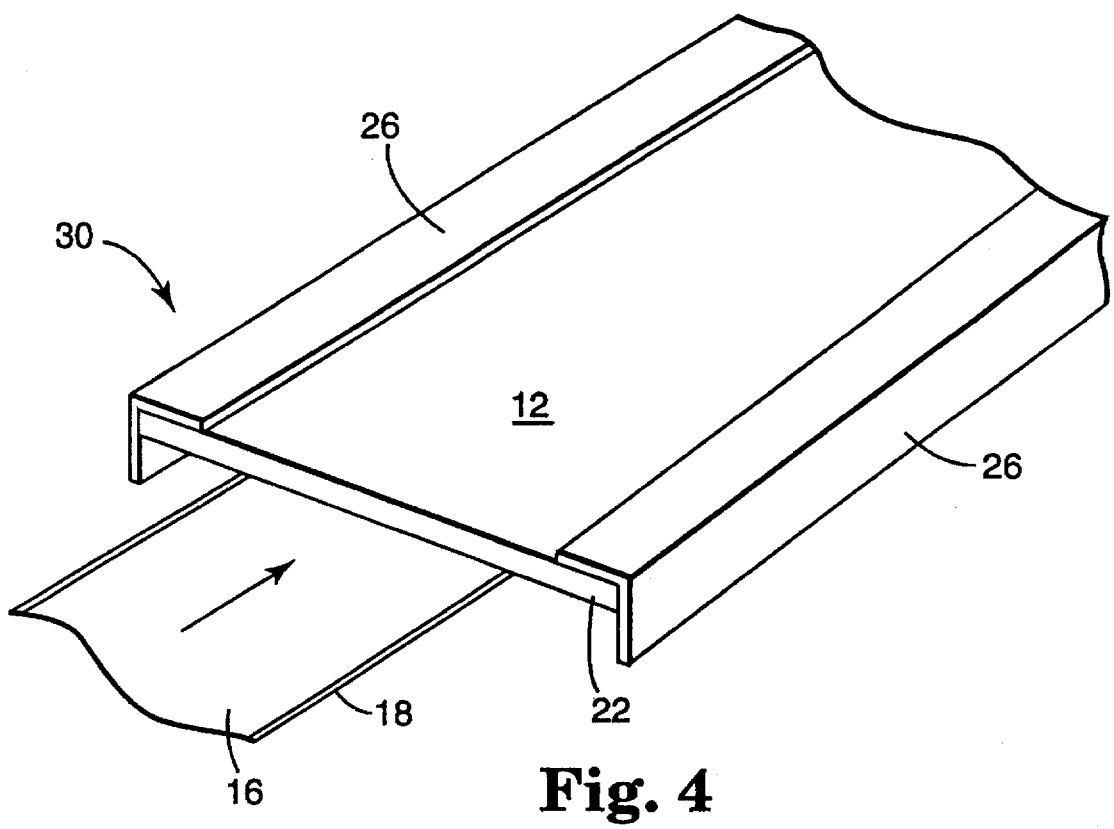
FIG. 4 is a perspective view of the drying apparatus according to another embodiment of the invention.
Figure 5:
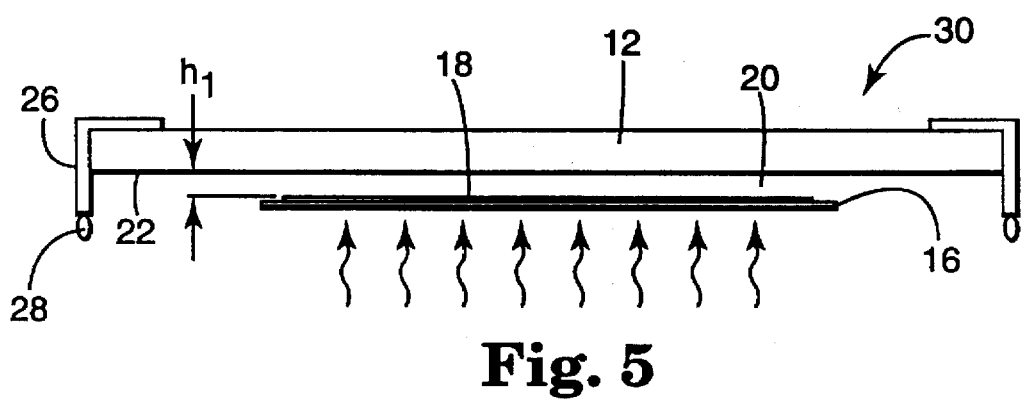
FIG. 5 is an end view of the apparatus of FIG. 4.

FIGS. 1, 2, and 3 show an apparatus using two platens. FIGS. 4 and 5 show an apparatus using one platen. In both versions, one platen has a condensing, liquid-transport surface located a short distance from the coated surface of the web. Distances of less than 15–20 cm are preferred. Distances less than 5 mm yield more advantages. Distances less than 0.5 mm and even distances as low as 0.1 mm and less are attainable.

Figure 16:
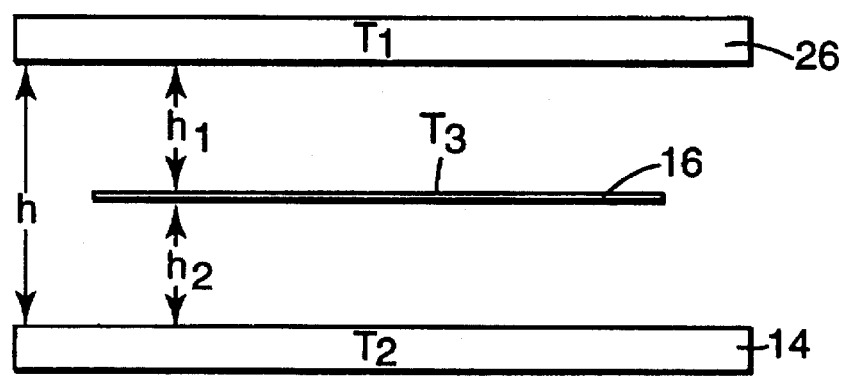
FIG. 16 is a schematic side view of the invention showing process variables.

In FIGS. 1 and 2, the apparatus 10 includes a condensing platen 12, which can be chilled, spaced from a heated platen 14. The condensing platen 12 is set to a temperature $T_1$, which can be above or below ambient temperature, and the heated platen 14 is set to a temperature $T_2$, which can be above or below ambient temperature. The coated web 16 temperature is $T_3$. The web position is defined by $h_1$ and $h_2$, the distances between the respective facing surfaces of the web 16 and the condensing and heated platens. FIG. 16 shows the relative locations of these variables. The total gap between the condensing platen and any heating platen, h, is the total of $h_1$, $h_2$, and the coated web thickness. The web 16, having a coating 18, travels at any speed between the two platens. Alternatively, the web can be stationary and the entire apparatus 10 moves or both the web and apparatus move. The platens are stationary within the apparatus. The heated platen 14 is located on the non-coated side of the web 16, either in contact with the web or with a small gap $h_2$ between the web and the platen. The condensing platen 12 is located on the coated side of the web 16, with a small gap $h_1$ between the web and the platen. The condensing platen 12 and the heated platen 14 eliminate the requirement for applied convection forces both above and below the web 16. Drying is controlled by adjusting the temperatures $T_1$, $T_2$, and distances $h_1$, $h_2$.

The condensing platen 12, which can be stationary or mobile, is placed near the coated surface (such as 10 cm away, 5 cm away, or closer). The arrangement of the platens creates a small gap adjacent the coated web. The gap is substantially constant, which permits small amounts of convergence or divergence. Also, the gap is substantially constant notwithstanding any grooves (discussed below) on the condensing surface. The orientation of the platens is not critical. The condensing platen 12 can be above the web (as shown in FIGS. 1, 2, 4, and 5–9), below the web (with the coating on the bottom surface of the web), and the system can operate with the web vertical or at any other angle, including being tilted around the axis of the direction of web travel.

The heated platen 14 supplies energy without requiring applied convection through the web 16 to the coating 18 to evaporate liquid from the coating 18 to dry the coating. Energy is transferred by a combination of conduction, radiation, and convection achieving high heat transfer rates. This evaporates the liquid in the coating 18 on the web 16. The evaporated liquid from the coating 18 then is transported (using diffusion and convection) across the gap $h_1$ between the web 16 and the condensing platen 12 and condenses on the bottom surface of the condensing platen 12.

As shown in FIG. 3, the bottom surface of the condensing platen 12 is the condensing surface 22 and has transverse open channels or grooves 24 which use capillary forces to prevent the condensed liquid from returning to the coating by gravity and to move the condensed liquid laterally to edge plates 26. The grooves can be triangular, rectangular, circular, or other more complex shapes or combinations of shapes. The groove material, geometry, and dimensions are designed to accommodate the required mass flow and the physical properties of the condensate, such as surface tension, viscosity, and density.

A specific type of condensing surface is one which has open channels or grooves with corners. This type of capillary condensing surface, shown for example in FIG. 3, is a geometrically specific surface which can be designed with the aid of the Concus-Finn Inequality (Concus P. and Finn R. "On the Behavior of a Capillary Surface in a Wedge," Proceeding of the National Academy of Science, vol. 63, 292–299 (1969)) which is: $\alpha+\theta_s<90°$, where $\alpha$ is half the included angle of any corner and $\theta_s$ is the gas/liquid/solid static contact angle. The static contact angle is governed by the surface tension of the liquid for a given surface material in gas. If the inequality is not satisfied, the interface is bounded; if the inequality is satisfied, the interface does not have a finite equilibrium position and the meniscus is unbounded. In this latter case, the liquid will advance by capillarity indefinitely or to the end of the channel or groove. Cornered grooved surfaces are helpful when the coating liquid has a high surface tension, such as water. Capillary surfaces with corners are discussed in great detail in Lopez de Ramos, A. L., "Capillary Enhanced Diffusion of $CO_2$ in Porous Media," Ph.D. Dissertation, University of Tulsa (1993).

The grooves 24 also can be longitudinal or in any other direction. If the grooves are in the longitudinal direction, a suitable collection system can be placed at the ends of the grooves to prevent the condensed liquid from falling back to the coated surface 18. This embodiment limits the length of a condensing plate 12 and also limits the minimum gap $h_1$.

When the liquid reaches the end of the grooves 24 it intersects with the angle between the edge plates 26 and the condensing surface 22. A liquid meniscus forms and creates a low pressure region which draws the condensate from the condensing surface to at least one edge plate. Gravity overcomes the capillary force in the meniscus and the liquid flows as a film or droplets 28 down the face of the edge plates 26. The edge plates 26 can be used with any condensing surface, not just one having grooves. The droplets 28 fall from each edge plate 26 and can be collected in a collecting device (not shown). For example, a slotted pipe can be placed around the bottom edge of each edge plate 26 to collect the liquid and direct it to a container. The edge plates 26 are shown throughout the application as contacting the ends of the condensing surface of the condensing platens. However, the edge plates can be adjacent the condensing platens without contacting them as long as they are functionally close enough to receive the condensed liquid.

Alternatively, the condensed liquid need not be removed from the platen at all, as long as it is removed from the condensing surface 22, or at least prevented from returning to the web 16. Also, the edge plates 26 are shown as perpendicular to the condensing surface 14, although they can be at other angles with it, and the edge plates 26 can be smooth, grooved, porous, or other materials.

The heated platen 14 and the condensing platen 12 can include internal passageways, such as channels. A heat transfer fluid can be heated by an external heating system and circulated through the passageways to set the temperature $T_2$ of the heated platen 14. The same or a different heat transfer fluid can be cooled by an external chiller and circulated through the passageways to set the temperature $T_1$ of the condensing platen 12. Other mechanisms for heating the platen 14 and cooling the platen 12 can be used.

The apparatus 30 of FIGS. 4 and 5 is similar to that of FIGS. 1–3 except there is no heating platen. In the apparatus 30, the web 16 is heated to evaporate the liquid from the coating by any heating method or combination of heating methods, whether conduction, radiation, microwave, convection, or ambient energy, using any type of heater. This can include but is not limited to a heated drum, radiant heating devices, or forced gas flows. This system can even operate without any applied energy, even outside the dryer, using only ambient energy to evaporate the liquid. The apparatus 30 otherwise operates the same as that of FIGS. 1–3, without requiring applied convection for transport of the evaporated liquid from the web 16 to the condensing surface 22 on the condensing platen 12. The gap $h_1$ between the coated web 16 and the condensing surface 22 is isolated from the heating devices by any combination of the web 16 and web supports or other barriers. This can isolate the area from any applied convection.

Figure 6:
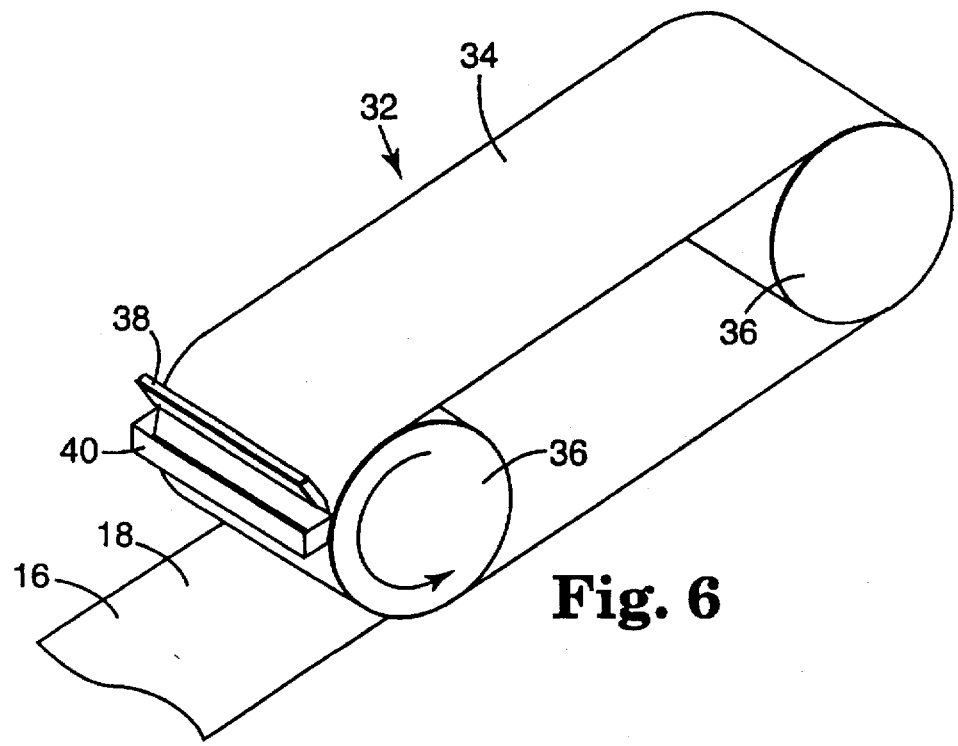
FIG. 6 is a perspective view of the drying apparatus according to another embodiment of the invention.

In FIG. 6, the apparatus 32 includes a belt 34 which has the condensing surface 22. The belt 34 substantially corresponds to the shape of the substrate and provides a gap between the substrate and the condensing surface. The belt can be solid or porous and can be made of a variety of materials. The belt is driven by rollers 36 which can provide relative movement between the condensing surface 22 and the substrate 16. Alternatively the condensing surface 22 can be driven to provide no movement relative to the web 16 or it can be driven in the opposite direction of the web 16.

Alternatively the entire system can be rotated from the position shown and the belt 34 can be driven substantially transverse to the direction of movement of the web 16. In this method the liquid would be removed beyond the edge of the web 16. Removal of the liquid from the condensing surface 22 is provided by a mechanical wipe 38 which is adjacent to the belt 34. The mechanical wipe 38 removes the liquid from the condensing surface 22 using shear forces and directs it to a suitable collection device 40.

Figure 7:
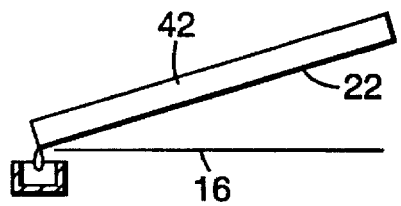
FIG. 7 is a cross-sectional view of the drying apparatus according to another embodiment of the invention.
Figure 8:
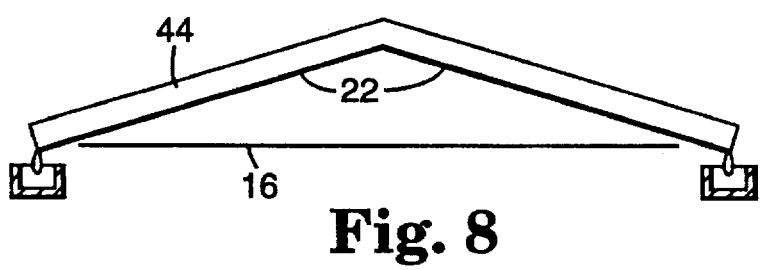
FIG. 8 is a cross-sectional view of the drying apparatus according to another embodiment of the invention.

FIGS. 7 and 8 show embodiments of the apparatus where gravity is used to remove the liquid solvent from the condensing surface. The condensing surface 22 is on a plate 42 which is tilted to one transverse side of the web 16 in FIG. 7 and the condensing surface 22 is on one or two plates 44 which are tilted from the center to both transverse sides of the web 16 in FIG. 8. In both cases gravity is used to move the liquid away from the condensing surface. The angle could be centered on the longitudinal centerline of the web or it can be off-center. Capillarity can be combined with gravity.

Figure 9:
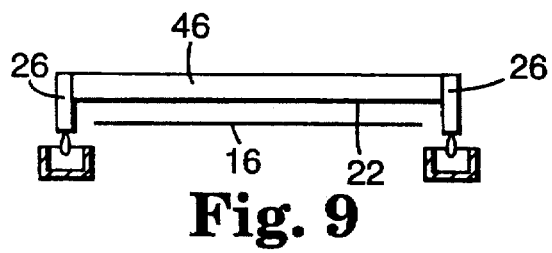
FIG. 9 is a cross-sectional view of the drying apparatus according to another embodiment of the invention.

FIG. 9 is another embodiment where capillary forces remove the liquid from the condensing surface. In this embodiment the condensing plate 46 is a porous or wicking material, such as sintered metal or sponge, which uses capillary forces to transport the liquid solvent. The solvent condenses on the condensing surface 22 and is distributed throughout the condensing plate 46 due to capillary forces. The edge plates 26 adjacent the condensing plate 46 form a capillary surface. A liquid meniscus forms and creates a low pressure region which draws the condensate from the condensing surface to at least one edge plate. Gravity overcomes the capillary force and the liquid flows as a film or droplets down the surface of the edge plate 26.

Figure 10:
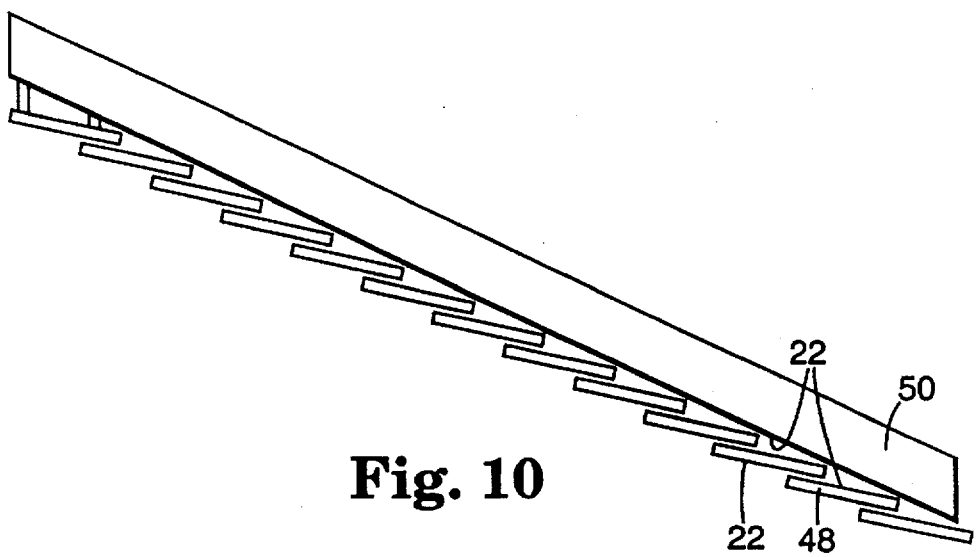
FIG. 10 is a schematic side view of the drying apparatus according to another embodiment of the invention.

FIG. 10 shows another embodiment where capillary and gravity forces are used to transport the condensed liquid from the condensing surfaces 22. As shown, condensing surfaces 22 are formed on many surfaces. A condensing platen 48 is tilted to one side or from the center to both sides above the web 16. Thin sheets 50 of material are suspended below the condensing platen 48 and located such that they are slanted away from the horizontal with their lower edge facing the lower edge of the condensing platen 48. As shown, the sheets 50 of material overlap by at least 0.05 cm and are spaced apart in the overlap region by a 0.01–0.25 cm slot. Vapor that condenses on the condensing surfaces 22 will be retained on the surfaces by surface tension. Gravity carries the condensed liquid down each upper surface of the sheets 50 in a cascade effect until the liquid is beyond the edge of the web 16. Liquid that is condensed on the lower surface of the thin sheets 50 will transport to the overlap region and capillary forces created by the slot will draw the liquid into the slot. The liquid will then be transferred to the upper surface of the next sheet 50 and gravity will carry it in a cascade manner to the edge of the substrate. Thus, liquid condensing on the lower surface of the sheets will not form droplets that fall back to the coated substrate. In some cases it is desirable for the liquid to completely fill the slot between the sheets 50 and the condensing platen 48.

Figure 11:
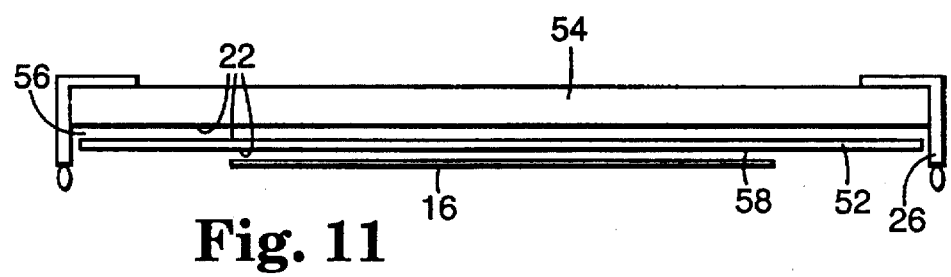
FIG. 11 is a cross-sectional view of the drying apparatus according to another embodiment of the invention.

FIG. 11 is another embodiment which can combine gravity and capillary forces to transport the liquid from the condensing surface. In this embodiment a porous, slotted, sponge, honeycomb, screened, or otherwise foraminous material 52 is attached to and located below a condensing platen 54. The spacing between the condensing platen 54 and the foraminous material 52, the dimensions of the foramina in the material 52, and the ratio of open area to solid area on the foraminous material 52 are all designed to cause the surface tension forces to retain the liquid on the three condensing surfaces 22. The apparatus is located adjacent to the web 16. Vapor condensing on the condensing surfaces 22 will be retained as liquid in the voids of the foraminous material and in the plate spacing region 56. As liquid is removed from the plate spacing region 56, liquid on the side of the foraminous material 52 facing the web 16 will be transported by capillary forces to fill the void in the plate spacing region 56. Liquid can be removed from the plate spacing region 56 either by gravity, capillary, or mechanical forces. By sloping the condensing platen 54 away from the horizontal in any direction, gravitational forces will remove liquid from the plate spacing region 56 to a point beyond the edge of the web 16. Alternatively, the liquid can be removed from the plate spacing region 56 by positioning at least one edge plate 26 at the edge of the condensing platen 54. The edge plate 26 contacts the condensing platen 54 to form a capillary surface. The edge plates can, in some uses, contact the foraminous material 22. A liquid meniscus forms and creates a low pressure region which draws the condensate toward at least one edge plate. Gravity overcomes the capillary force and the liquid flows as a film or droplets down the surface of the edge plate 26. Also, the condensate can be mechanically pumped out of the plate spacing region 56.

Figure 12:
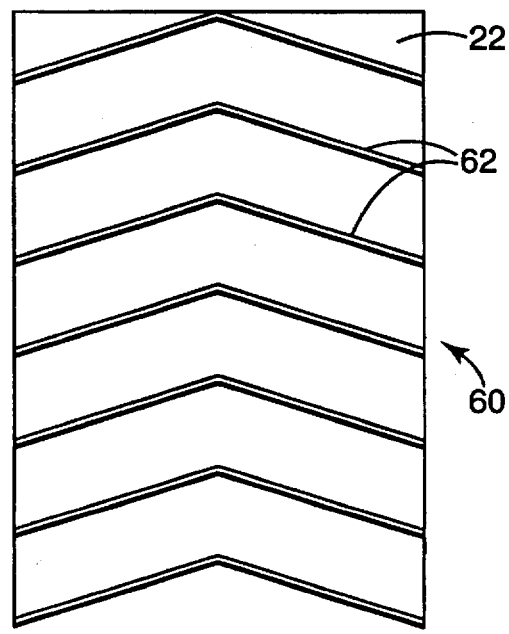
FIG. 12 is a bottom view of a condensing platen according to another embodiment of the invention.

FIG. 12 shows a condensing platen 60 with protruding structures. The condensing platen 60 provides a condensing surface 22 that can substantially correspond to the shape of the web 16. Gravity is used to remove the liquid from the condensing surface 22 by positioning the platen 60 away from horizontal. This tilting from the horizontal can be in any direction, including transverse and parallel to the web 16 path. Without any additional device, the liquid draining from the condensing surface 22 will, over a short distance (typically less than a meter), build a sufficient film thickness such that the surface tension forces will be incapable of retaining the liquid and the liquid will fall as droplets onto the web 16. Structure having any geometric shape, such as ribs 62, can be positioned on the condensing surface 22 of the condensing platen 60 to limit the buildup of film thickness, and prevent the formation of droplets that fall onto the web 16. The ribs 62 are located diagonally to the slope of the condensing surface 22 to direct the liquid beyond the edge of the web 16 to a suitable collecting device (not shown). They are provided in sufficient number and at a suitable spacing to limit the surface area drained by a specific rib 62 thereby maintaining the film thickness below the critical point for the occurrence of droplet formation. The condensing surface can have grooves that run in the longitudinal web direction.

Figure 13:
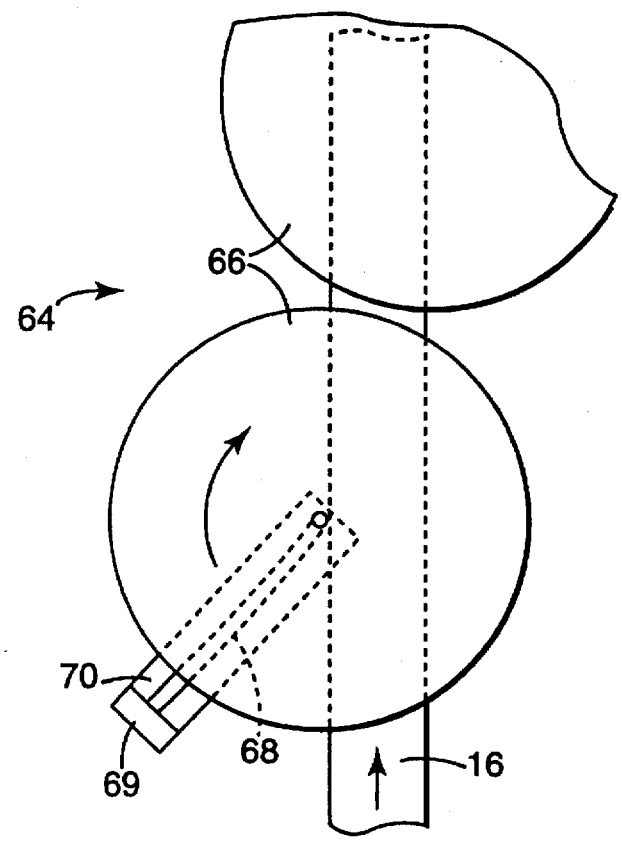
FIG. 13 is a top view of the drying apparatus according to another embodiment of the invention.

The apparatus 64 of FIG. 13 mechanically moves the condensing surface and condensed liquid beyond the edge of the web 16 where the liquid is then removed. A condensing platen 66 provides the condensing surface 22 that is located adjacent to the web 16. The platen 66, which can be circular or any other shape, is mechanically rotated so that the liquid that condenses on its condensing surface 22 is transported to an area beyond the edge of the web 16. Removal of the liquid from the condensing surface 22 is provided by a mechanical wipe 68 which is adjacent the condensing surface 22 and anchored to a block 69. The mechanical wipe 68 uses shear forces to remove the liquid from the condensing surface 22 and direct it to a suitable collection device 70. A series of these systems can be located such that they substantially correspond to the shape of the substrate in the longitudinal direction.

Figure 14:
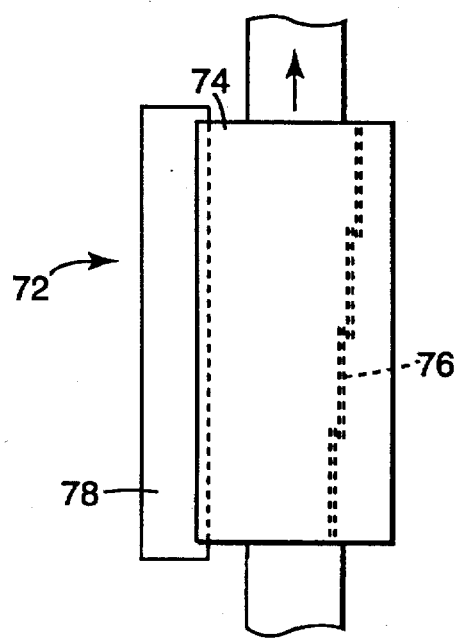
FIG. 14 is a top view of the drying apparatus according to another embodiment of the invention.

FIG. 14 shows an apparatus 72 that uses surface tension to retain the liquid and a mechanical device to remove the liquid from the condensing surface. A condensing platen 74 provides a condensing surface 22 that can substantially correspond to the shape of the web 16. Liquid that condenses on the condensing surface 22 is retained on that surface by surface tension. Removal of the liquid from the condensing surface 22 is provided by one or more mechanical wipes 76 which is adjacent the condensing surface 22. The mechanical wipe 76 can move across the condensing surface 22 transverse to the path of the web 16, parallel to the path of the web 16, or in any other direction. The mechanical wipe 76 uses shear forces to remove the liquid from the condensing surface 22 and direct it to a suitable collection device 78 located below the mechanical wipe 76. The liquid is carried in the collection device 78 beyond the edge of the web 16 where it is transferred away.

Figure 15:
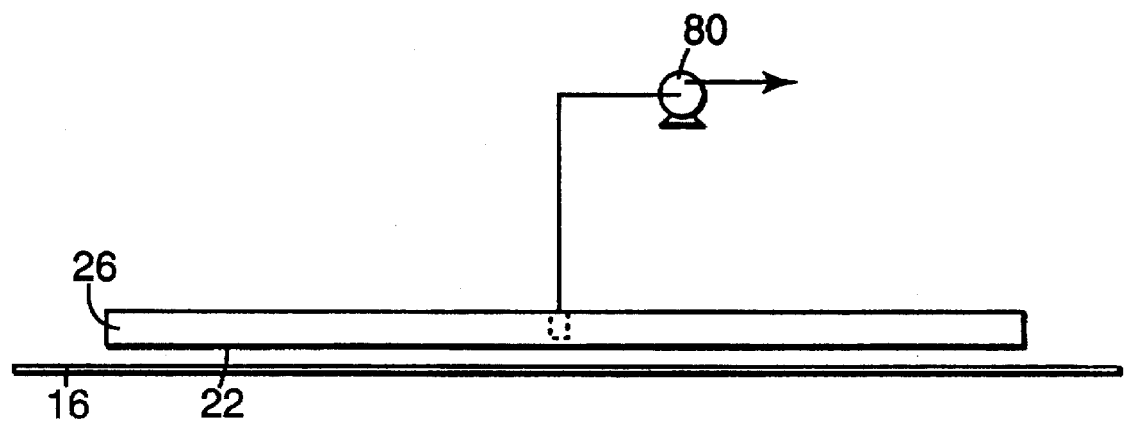
FIG. 15 is a side view of the drying apparatus according to another embodiment of the invention.

FIG. 15 schematically shows an embodiment which uses a pump 80 to remove the condensed liquid from the condensing surface. The pump can be any type of pump, and any other device for creating negative pressure can be used. As also shown in FIG. 15, the condensed liquid can be driven toward the transverse center of the condensing surface before removal, such as by capillarity and gravity.

In another use, the system can first remove fluid from a coated substrate. Then, the system, at a downweb location from the drying location, can be used "in reverse" to add some small portion of moisture or additional reactant to the substrate to modify the coating.

The apparatus can operate outside of a dryer configuration without any applied energy, and with only ambient heat to evaporate the liquid. By controlling the temperature of the condensing surface 22 to be at or near the ambient temperature, the liquid evaporation will only occur until the vapor concentration in the gap $h_1$ between the condensing surface and the web 16 is at the saturated concentration as defined by the condensing surface 22 and web 16 temperatures. The liquid that has evaporated will be contained and carried by the viscous drag of the web through the gap $h_1$ to the exit of the system. Undesirable drying can be reduced and vapor emissions can be isolated from ambient conditions.

The drying system of the invention can be used to reduce or virtually stop the drying of the coating. The rate of drying is a function of the gap height and vapor concentration gradient between the coated surface 18 of the web 16 and the condensing surface 22. For a given gap $h_1$, the temperature differential between the web 16 and the condensing surface 22 defines the vapor concentration gradient. The higher the coated surface 18 temperature relative to the condensing surface 22, the greater the rate of drying. As the temperature of the condensing surface 22 approaches the coated surface 18 temperature, the drying rate will tend to zero. In conventional drying the vapor concentration gradient cannot be controlled without using an expensive inert gas drying system. Some liquid coatings have multiple solvents where one or more of the solvents function to slow down the rate of drying for optimum product properties. By adjusting the coated surface 18 and condensing surface 22 temperatures, the invention can reduce the drying rate and possibly eliminate the requirement of using solvents to retard the drying rate.

The rate of drying is controlled by the height of the gap $h_1$ and the temperature differential between the coated surface 18 and the condensing surface 22. Therefore for a given temperature differential, the rate of drying can be controlled by the position of the condensing plate which defines the gap $h_1$. Thus by changing the dimensions of the drying system, such as by changing the relative gaps, it is possible to control the rate of drying. Conventional dryers do not have this capability.

Drying some coated webs using applied convection can create mottle patterns in the coatings. Mottle patterns are defects in film coatings that are formed by vapor concentration or gas velocity gradients above the coating which cause non-uniform drying at the liquid surface. Normal room air currents are often sufficient to create these defects. The invention can be used to reduce and control natural convection induced defects, such as mottle, at locations outside the desired drying position. In locations where the coated surface is not in the drying region and would otherwise be exposed to convection from either ambient air currents or from a turbulent boundary layer air due to web movement, the apparatus, with grooves or other liquid transport and removal features, devices, structures or without, can be located adjacent to the coated web 16 separated by a gap $h_1$. The location of the condensing plate 12 adjacent the coated web 16 can isolate the ambient air currents from the coating surface. It can also prevent the boundary layer air above the coated surface from becoming turbulent. Accordingly, defects due to convection outside the drying position, such as mottle, can be reduced or eliminated. The apparatus can be operated with condensation and solvent removal similar to FIGS. 4–15, or it can even operate without condensation and solvent removal by raising the condensing surface 22 temperature above the dew point of the vapors in the gap $h_1$.

In all embodiments it may be desirable to provide multiple zones of heating and condensing components using multiple pairs. The temperatures and gaps of each pair of heating and condensing components can be controlled independently of the other pairs. The zones can be spaced from each other or not.

The systems of all of the embodiments use condensation close to the coated web 16 with a small gap between the coating on the web 16 and the condensing surface 22. There is no requirement for applied convection and there is very little vapor volume. The vapor concentration and convection forces can be controlled by adjusting the web temperature, the gap, and the condensing surface temperature. This provides improved control of the conditions near the gas/liquid interface. Because the plate temperatures and gap can be continuous and constant throughout the drying system, heat and mass transfer rates are more uniformly controlled than with conventional drying systems. All of these factors contribute to improved drying performance. It also improves the efficiency of the condensation vapor recovery systems, providing for liquid recovery at high efficiencies at no additional cost compared to known expensive methods of burning, adsorption, or condensation in a secondary gas stream.

Also, there is less of a concern about the ambient air above the web exploding or being above the flammability limit. In fact, where the gap is very small, such as less than 1 cm, flammability concerns may be eliminated because the entire space above the web has insufficient oxygen to support flammability. Additionally, this system eliminates the need for large gas flows. The mechanical equipment and control system is only 20% of the cost of a conventional air flotation drying system.

Experiments were conducted with 30.5 cm wide platens having transverse grooves. The bottom platen was heated to temperatures in the range of 15° C. through 190° C. with a heat transfer fluid circulated through passageways in the platens. As the heat is transferred to the coating, the liquid in the coating evaporates. The temperature of the condensing platen was controlled by any suitable method in the range of −10° C. through 65° C. to provide the driving force for vapor transport and condensation. An effective range of the gap $h_1$ is 0.15–5 cm. Mottle-free coatings were obtained.

In one example, a mottle-prone polymer/MEK solution at 11.5% solids, 2 centipoise, 7.6 micron wet thickness, and 20.3 cm wide was coated. The web was 21.6 cm wide and traveled at a speed of 0.635 m/s. The temperature of the heated platen used to heat the web was controlled at 82° C. The condensing platen temperature was controlled at 27° C. The overall length of the platens was 1.68 m and they were mounted at a 3.4° angle from horizontal with the inlet side at a lower elevation. The inlet to the platens was located 76 cm from the coating application point. The heated platen was separated from the web by a gap of approximately 0.076 cm. The gap $h_1$ was set at 0.32 cm. The capillary grooves were 0.0381 cm deep with a 0.076 cm peak-to-peak distance, an angle α of 30°, and 0.013 cm land at the top of the grooves. The web was dried mottle-free in the 1.68 m length of the platens although there was some residual solvent in the coating when it left the platens. A conventional dryer would require approximately 9 m to reach the same drying point, requiring the dryer to be more than five times larger.

Other applications for this system include drying adhesives where blister defects are common. Blister defects may be caused by the coating surface forming a dried skin before the rest of the coating has dried, trapping solvent below this skin. With conventional drying, the solvent vapor concentration in the bulk gas is very low because of flammability limits. If too much heat is applied to the coating, the solvent at the surface will flash very quickly into the low vapor concentration gas stream and will form the skin on the surface. The system of this invention creates a controlled vapor concentration in the space above the web which can reduce the tendency to form a skin on the surface. Other applications are in areas where dryers are run at high solvent concentrations to obtain specific product performance.

The system provides advantages beyond solvent recovery and drying performance. Another advantage involves a simplified process for subjecting the coating fluid to a magnetic field. Rather than positioning a magnetic field generator within a known dryer, with the present invention the magnetic field generator can be positioned outside of the dryer (i.e., outside of apparatus 10, 30). This is enabled by the compact nature of the apparatus. This is especially suitable when coating a metal particulate-loaded fluid onto a substrate to make such products as video and audio recording tape, computer and data storage tape, computer diskettes, and the like. Being outside of the apparatus, the magnetic field generators are easily adjustable and maintained.

This setup also improves particle orientation. Magnetic output is improved if the particles are physically oriented in the direction of recording. Conventionally the orienting device is contained within the dryer and the particles are oriented at a single point or multiple points as the solvent is removed. One advantage here is that because the magnetic orienting device is outside of the dryer and is nonintrusive (conventional orienting devices inside the dryer disrupt the convection heat and mass transfer), it will not affect the solvent removal rates in any way. This allows uniform solvent removal. The magnetic particles are easily oriented when the fluid is less viscous at the early stages of drying with this invention. As the particles leave a conventional orienting device in the early stages of drying, any components of the magnetic field which are not in the plane of the coating will reorient the particles in a nonpreferred direction, such as tipping them vertically. As the solvent is removed, the viscosity increases, making it difficult for the orienting device to rotate the particles. The particles will not be reoriented when leaving the field or by interparticle forces.

Another advantage is that because of its small size and increased solvent removal rates, the invention allows orienting particles at the beginning of the dryer and orienting device. The uniform field holds the particles in the preferred direction as the solvent is removed in a uniform drying environment to such a level that the viscosity is increased to the point that the viscous forces dominate. This prevents undesirable particle disorientation as it leaves the orienting device or from interparticle forces. Drying in conventional dryers causes the surface of the product to roughen. Removing the solvent in the controlled environment of the dryer of this invention appears to create smoother surfaces at elevated solvent removal rates. This also improves magnetic output as, for example, the resulting tape will ride closer to the recording head.

We claim:

1. A method of drying a coated substrate comprising:

locating a condensing surface spaced from the substrate which substantially corresponds to the path of the substrate in the longitudinal direction to create a longitudinal gap between the substrate and the condensing surface;

evaporating the liquid from the substrate to create a vapor;

transporting the vapor to the condensing surface without requiring applied convection;

condensing the vapor on the condensing surface to create a condensate;

removing, using more than gravity, the condensate from the condensing surface without allowing nonuniformities of the condensate film to occur.

2. The method of claim 1 wherein the removing step comprises at least one of: tilting the condensing surface to at least one transverse side of the coated substrate such that gravity is used to remove the condensate from the condensing surface; and using mechanical shear forces.

3. The method of claim 1 wherein the condensing surface is formed of a plurality of discrete condensing surfaces, wherein at least one condensing surface is formed on a condensing platen located above and tilted to at least one transverse side of the coated substrate, and at least two other condensing surfaces are formed on upper and lower surfaces of a sheet, located below the condensing platen and located such that it is slanted away from the horizontal with its lower edge facing the lower edge of the condensing platen; and wherein the removing step comprises: retaining condensate on the condensing surfaces by surface tension forces; using gravity to carry the condensate down each upper surface of the sheets in a cascade effect until the condensate is beyond the edge of the coated substrate; and transporting condensate on the lower surface of the sheets to the overlap region between adjacent sheets and drawing, using capillary forces created by the slot between adjacent sheets, the condensate into the slot from where it is transferred to the upper surface of the next sheet and gravity will carry it in a cascade manner to the edge of the coated substrate, wherein condensate on the lower surface of the sheets will not fall back to the coated substrate.

4. The method of claim 1 wherein the removing step comprises using a condensing platen located above the coated substrate as one condensing surface and using an upper surface and a lower surface of a foraminous sheet located below and spaced from the condensing platen as the other condensing surfaces and further comprising the step of selecting the width of the space between the condensing platen and the foraminous sheet, the size of the foramina in the sheet, and the ratio of open area to solid area on the foraminous sheet to cause the surface tension forces to retain the condensate on the condensing surfaces.

5. The method of claim 4 wherein the removing step further comprises retaining condensate on the condensing surfaces as liquid in the space between the condensing surfaces on the condensing plate and the condensing surface on the upper surface of the foraminous sheet and on the lower surface of the foraminous sheet, wherein as condensate is removed from the space, liquid on the lower surface of the foraminous sheet will be transported by capillary forces to fill any void in the space.

6. The method of claim 4 wherein the removing step comprises sloping the condensing platen away from the horizontal in any direction.

7. The method of claim 4 wherein the removing step comprises positioning at least one edge plate at the edge of the condensing platen adjacent the condensing platen to form a capillary surface wherein liquid is transported at this interface.

8. The method of claim 1 wherein the removing step comprises moving the condensate in a substantially parallel direction to the direction of the relative motion between the substrate and the condensing surface using surface tension to retain condensate on the condensing surface, using gravity to remove the condensate from the condensing surface, and using structure on the condensing surface to limit the buildup of condensate and prevent the formation of droplets.

9. The method of claim 1 further comprising the step of providing relative movement between the condensing surface and the coated substrate.

10. The method of claim 1 further comprising the step of controlling the rate of drying by controlling the height of the gap and the temperature difference between the coated substrate and the condensing surface.

11. An apparatus for drying a coated substrate comprising:
a condensing surface spaced from the substrate which substantially corresponds to the path of the substrate in the longitudinal direction to create a longitudinal gap between the substrate and the condensing surface;
means for evaporating the liquid from the substrate to create a vapor;
means for transporting the vapor to the condensing surface without requiring applied convection;
means for condensing the vapor on the condensing surface to create a condensate; and
means for removing, using more than gravity, the condensate from the condensing surface without allowing nonuniformities of the condensate film to occur.

12. The apparatus of claim 11 wherein the evaporating means comprises a heated plate which supplies heat by conduction to increase the rate of heat transfer compared to conventional drying methods that use convection.

13. The apparatus of claim 11 wherein the removing means comprises at least one of: tilting the condensing surface to at least one transverse side of the coated substrate such that surface tension holds the condensate onto the condensing surface and gravity is used to remove the condensate from the condensing surface; forming the condensing surface of a foraminous material; and a wiper.

14. The apparatus of claim 11 wherein the condensing surface is formed of a plurality of discrete condensing surfaces, wherein at least one condensing surface is formed on a condensing platen located above and tilted to at least one transverse side of the coated substrate, and at least two other condensing surfaces are formed on upper and lower surfaces of a sheet, located below the condensing platen and located such that it is slanted away from the horizontal with its lower edge facing the lower edge of the condensing platen.

15. The apparatus of claim 14 wherein the condensing surface comprises a plurality of sheets which overlap each other by at least 0.05 cm and are spaced apart in the overlap region by a 0.01–0.25 cm slot, wherein vapor that condenses on the condensing surfaces is retained on the surfaces by surface tension forces, wherein gravity carries the condensate down each upper surface of the sheets in a cascade effect until the condensate is beyond the edge of the coated substrate, and wherein condensate on the lower surface of the sheets will transport to the overlap region between adjacent sheets and capillary forces created by the slot between adjacent sheets will draw the condensate into the slot, from where it is transferred to the upper surface of the next sheet and gravity will carry it in a cascade manner to the edge of the coated substrate, wherein condensate on the lower surface of the sheets will not fall back to the coated substrate.

16. The apparatus of claim 11 wherein the condensing surface is formed of a plurality of discrete condensing surfaces, wherein at least one condensing surface is formed on a condensing platen located above the coated substrate, wherein at least two other condensing surfaces are formed on upper and lower surfaces of a foraminous sheet located below and spaced from the condensing platen.

17. The apparatus of claim 16 wherein the width of the space between the condensing platen and the foraminous sheet, the size of the foramina in the sheet, and the ratio of open area to solid area on the foraminous sheet are selected to cause the surface tension forces to retain the condensate on the condensing surfaces, and wherein condensate on the condensing surfaces will be retained as liquid in the space between the condensing surfaces on the condensing plate and the condensing surface on the upper surface of the foraminous sheet and on the lower surface of the foraminous sheet, wherein as condensate is removed from the space, liquid on the lower surface of the foraminous sheet will be transported by surface tension forces to fill any void in the space.

18. The apparatus of claim 16 wherein the condensing platen is sloped away from the horizontal in any direction to remove condensate by gravity.

19. The apparatus of claim 16 further comprising at least one edge plate positioned at the edge of the condensing platen to contact the condensing platen to form a capillary surface wherein liquid collects at this interface and can be removed by capillary force.

20. The apparatus of claim 11 wherein the condensing surface comprises diagonal ribs which direct the condensate beyond the edge of the coated substrate, and wherein the removing means comprises tilting the condensing surface in a longitudinal direction wherein the condensing surface comprises structure, wherein the condensate moves in a substantially parallel direction to the direction of the relative motion between the substrate and the condensing surface using surface tension to retain condensate on the condensing surface, using gravity to remove the condensate from the condensing surface, and using the structure to limit the buildup of condensate and prevent the formation of droplets.

21. The apparatus of claim 11 further comprising a belt, wherein the condensing surface is formed on the belt and means for providing relative movement between the condensing surface on the belt and the coated substrate.

22. The apparatus of claim 11 further comprising means for controlling the rate of drying by controlling the height of the gap and the temperature difference between the coated substrate and the condensing surface.

23. The apparatus of claim 11 wherein the condensing surface is formed of at least one of flat plates, grooved plates, tubes, or fins.

24. The apparatus of claim 23 wherein the condensing surface is formed of a foraminous plate which uses surface tension forces to retain and transport the condensate, wherein the condensate on the condensing surface is distributed throughout the condensing plate due to capillary forces.

25. The apparatus of claim 11 further comprising: a plurality of condensing surfaces; wherein the evaporating means comprises a plurality of heaters, and wherein each heater corresponds to a respective condensing surface to form pairs of condensing surfaces and heaters; and means for independently controlling each pair of condensing surface and heater.

26. A method of drying a coated substrate comprising:

locating a condensing surface spaced less than 5 mm from the substrate which substantially corresponds to the path of the substrate in the longitudinal direction to create a longitudinal gap between the substrate and the condensing surface;

evaporating the liquid from the substrate to create a vapor;

transporting the vapor to the condensing surface without requiring applied convection;

condensing the vapor on the condensing surface to create a condensate; and removing the condensate from the condensing surface.

27. An apparatus for drying a coated substrate comprising:

a condensing surface spaced less than 5 mm from the substrate which substantially corresponds to the path of the substrate in the longitudinal direction to create a longitudinal gap between the substrate and the condensing surface;

means for evaporating the liquid from the substrate to create a vapor;

means for transporting the vapor to the condensing surface without requiring applied convection;

means for condensing the vapor on the condensing surface to create a condensate; and means for removing the condensate from the condensing surface.

* * * * *